(12) United States Patent
High et al.

(10) Patent No.: US 10,139,817 B2
(45) Date of Patent: Nov. 27, 2018

(54) UNMANNED AIRCRAFT SYSTEMS AND METHODS TO INTERACT WITH SPECIFICALLY INTENDED OBJECTS

(71) Applicant: Walmart Apollo, LLC, Bentonville, AR (US)

(72) Inventors: Donald R. High, Noel, MO (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/457,638

(22) Filed: Mar. 13, 2017

(65) Prior Publication Data

US 2017/0261977 A1   Sep. 14, 2017

Related U.S. Application Data

(60) Provisional application No. 62/308,140, filed on Mar. 14, 2016.

(51) Int. Cl.
| | |
|---|---|
| *G05D 1/00* | (2006.01) |
| *G06K 9/00* | (2006.01) |
| *B64D 1/22* | (2006.01) |
| *B64D 47/08* | (2006.01) |

(Continued)

(52) U.S. Cl.
CPC .......... *G05D 1/0011* (2013.01); *B64C 39/024* (2013.01); *B64D 1/22* (2013.01);
(Continued)

(58) Field of Classification Search
CPC .... G01C 23/00; G01C 23/005; G08G 5/0013; G08G 5/0021; G08G 5/0052; G05D 1/0061; G05D 1/0858; G05D 1/101; B64C 13/18; B64C 27/001; B64C 27/54; B64C 27/82; B64C 27/04; B64C 27/12; B64C 2700/6281; B64C 27/10; B64C 27/52

See application file for complete search history.

(56) References Cited

U.S. PATENT DOCUMENTS

| | | |
|---|---|---|
| 8,082,102 B2 | 12/2011 | Ravenscroft |
| 8,543,265 B2 | 9/2013 | Ekhaguere |

(Continued)

OTHER PUBLICATIONS

PCT; App. No. PCT/US2017/021774; International Search Report and Written Opinion dated Nov. 16, 2017.

*Primary Examiner* — Thomas G Black
*Assistant Examiner* — Ce Li Li
(74) *Attorney, Agent, or Firm* — Fitch, Even, Tabin & Flannery LLP

(57) ABSTRACT

In some embodiments, systems, apparatuses, methods, and processes are provided to control and allocate UASs. In some embodiments, a system to control unmanned aircraft systems (UAS), comprises: one or more wireless transceivers configured to communicate with the UAS; a control circuit coupled with the transceiver(s); and a memory coupled to the control circuit and storing computer instructions that when executed by the control circuit cause the control circuit to perform the steps of: receive sensor data captured by at least one sensor of a UAS; determine, from the sensor data, unique identification of an object at a predefined location; and confirm, from the sensor data, that the identified object is an expected object expected at the predefined location.

16 Claims, 3 Drawing Sheets

(51) Int. Cl.
*B64C 39/02* (2006.01)
*G06Q 10/00* (2012.01)
*G06K 9/32* (2006.01)

(52) U.S. Cl.
CPC ......... *B64D 47/08* (2013.01); *G06K 9/00288* (2013.01); *G06K 9/00624* (2013.01); *G06K 9/3216* (2013.01); *G06Q 10/00* (2013.01); *B64C 2201/128* (2013.01)

(56) References Cited

U.S. PATENT DOCUMENTS

| | | |
|---|---|---|
| 8,909,391 B1 | 12/2014 | Peeters |
| 8,930,044 B1 | 1/2015 | Peeters |
| 9,550,577 B1 | 1/2017 | Beckman |
| 9,573,684 B2 * | 2/2017 | Kimchi ................ B64C 39/024 |
| 2011/0084162 A1 | 4/2011 | Goossen |
| 2013/0332008 A1 | 12/2013 | Herman |
| 2014/0032034 A1 | 1/2014 | Raptopoulos |
| 2015/0120094 A1 | 4/2015 | Kimchi |
| 2015/0277440 A1 | 10/2015 | Kimchi |
| 2015/0317597 A1 * | 11/2015 | Shucker ............... G06Q 10/083 |
| | | 235/375 |
| 2016/0023762 A1 * | 1/2016 | Wang ....................... B64F 1/00 |
| | | 701/3 |
| 2016/0068264 A1 * | 3/2016 | Ganesh ................ G08G 5/0069 |
| | | 701/2 |
| 2016/0196755 A1 | 7/2016 | Navot |
| 2016/0257401 A1 | 9/2016 | Buchmueller |
| 2017/0011343 A1 * | 1/2017 | Stenneth ................. B25J 9/163 |
| 2017/0110017 A1 | 4/2017 | Kimchi |

* cited by examiner

UNMANNED AIRCRAFT SYSTEMS AND METHODS TO INTERACT WITH SPECIFICALLY INTENDED OBJECTS

CROSS-REFERENCE TO RELATED APPLICATION

This application claims the benefit of U.S. Provisional Application No. 62/308,140, filed Mar. 14, 2016, which is incorporated herein by reference in its entirety.

TECHNICAL FIELD

This invention relates generally to unmanned aircraft systems (UAS).

BACKGROUND

In a modern retail environment, there is a need to improve the customer service and/or convenience for the customer. One aspect of customer service is the delivery of products. There are numerous ways to delivery products to customers. Getting the product to a delivery location, however, can cause undesirable delays, can add cost and reduce revenue.

BRIEF DESCRIPTION OF THE DRAWINGS

Disclosed herein are embodiments of systems, apparatuses and methods pertaining to unmanned aircraft systems (UAS). This description includes drawings, wherein.

Figure 1:
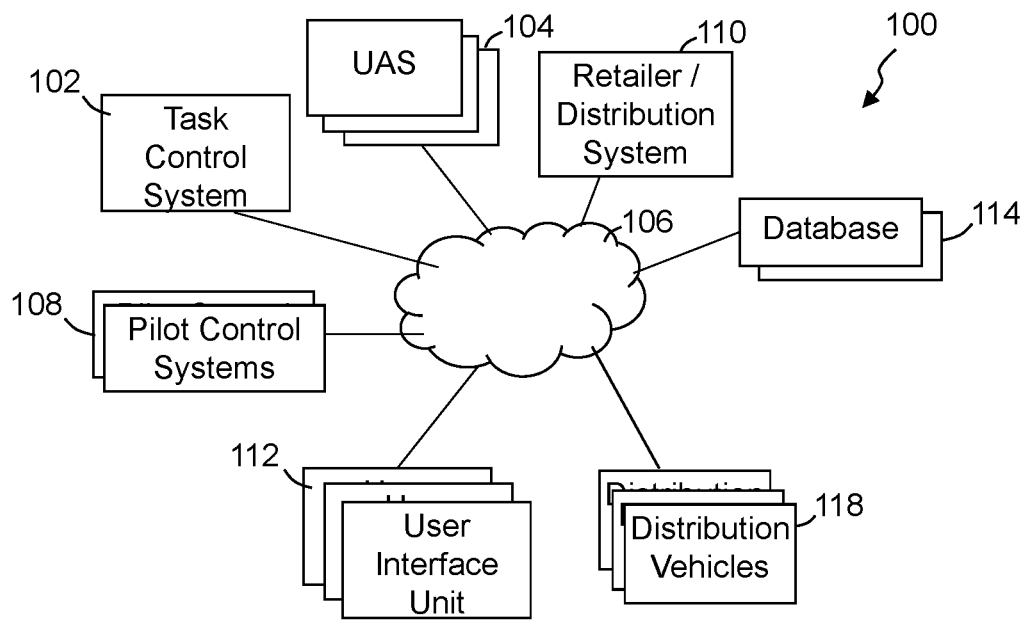
FIG. 1 illustrates a simplified block diagram of an exemplary UAS control system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provide to utilize unmanned aircraft systems (UAS) in delivering packages to customers at scheduled locations and/or performing other tasks at predefined locations. Some embodiments utilize sensors on UASs to detect objects that are intended to be interacted with in addition to detecting objects that the UAS should avoid. In some embodiments, a system recognizes objects so that UASs can interact with intended objects. UASs are configured with one or more sensors (e.g., cameras, distance measurement sensors, signal strength sensors, beacon detectors, and the like) that can capture corresponding sensor data. This UAS detected sensor data can be utilized to determine a unique identification of an object intended to be interacted with at a predefined location, such as an intended delivery location where a UAS is to deliver a package. Further, using the sensor data the identified object can be confirmed as an expected object that is expected at the predefined location. Some embodiments include a control circuit that communicates through one or more transceivers. The control circuit can receive the sensor data captured by one or more sensors of a UAS. From the sensor data the control circuit can determine a unique identification of an object at a predefined location, and confirm that the identified object is an object expected at the predefined location and typically an object with which the UAS in intended to interact.

FIG. 1 illustrates a simplified block diagram of an exemplary UAS control system 100, in accordance with some embodiments. The exemplary UAS control system 100 includes one or more task control systems 102 and multiple unmanned aircraft systems (UAS) 104. The UASs are in communication over one or more distributed communication and/or computer networks 106 with the task control system 102. The task control system controls the distribution and/or provides flight path information to the UASs in implementing one or more tasks, such as but not limited to delivering packages, capturing video, obtaining inspection data, and other such tasks. It is noted that the below description generally describes a task of performing deliveries of products, however, the system is not limited to performing deliveries and instead can be applied to numerous other tasks. Some embodiments include one or more pilot control systems 108 that allow a remote pilot to provide flight commands to be implemented by the UAS. The flight commands can be a single simple command (e.g., change course), a series of commands, or allowing the remote pilot to take over full control of a UAS for at least a period of time.

One or more retailer and/or product distribution center systems 110 may be accessible over the one or more distributed networks 106 by customers using user interface units 112 (e.g., computer, laptop, smart phones, tablets, and other such devices) and/or other such customer devices. Customers can access a retailer system and purchase one or more products. Further, the customers may elect to have the purchased products delivered. The system includes and/or is accessible by multiple user interface units 112, each associated with at least one customer. The user interface units can communicate via the communication network 106 with the retailer system 110, and in some applications can communicate with the task control system 102 and/or a UAS. Some embodiments further utilize one or more distribution and/or launch vehicles 118 that transport one or more UASs, and when relevant packages to be delivered by those UASs, to strategic launch locations from which one or more UASs can be launched to implement the intended task (e.g., unmanned aerial delivery, video capture, establish wireless network, etc.).

The task control system 102 is configured to coordinate the tasks performed by the UASs 104, such as coordinate the delivery of packages and/or products ordered by customers. This can include determining and/or providing delivery scheduling, flight schedules, flight route plans, alternate route information, identification of no-fly zones, and/or other such functions. In some applications, product orders are received from the retailer systems 110. The retailer systems may include Internet market retailer sources, in-store order systems, and/or other such sources. Further, the product orders may designate and/or request that one or more products of the order are to be delivered by an UAS. Additionally or alternatively, customers may register with a retail entity that maintains a customer profile or record, and during the registration the customer may have authorized and/or requested products be delivered using the UAS.

Based on the received orders and/or other tasks scheduled to be performed by one or more UASs, the task control system can schedule deliveries (and/or tasks) and provide relevant routing and/or flight path information to a corresponding one of the UASs 104. The determined flight path is determined based on a designated delivery location received from the customer and/or a task location where the UAS is to perform or assist in performing the task. In some embodiments, the customers may use their portable user interface units 112 to specify a delivery location. Based on the specified delivery location, the task control system can determine a scheduled delivery based on one or more factors, along with a flight path or route that an UAS is to travel while carrying the one or more packages for delivery. Accordingly, some embodiments enable an UAS to be able to deliver a payload to a determined delivery location and/or perform other tasks at predefined task locations.

In operation, sensor data is received corresponding to the task being performed and/or the delivery of the package. The sensor data typically includes sensor data captured by one or more sensors of a UAS 104. Other sensor data may be received from other devices, such as but not limited to user interface units 112, fixed cameras, other UASs, and/or other such devices. Based on the sensor data, an object can be identified as being within a class of objects, a unique identification of an object at a predefined location can be identified, and other such identification. This object may be a delivery and/or landing pad at an intended delivery location, a delivery locker at an intended delivery location, a customer, a building, a particular vehicle, a UAS launch system, a UAS hanger, or other such object at the predefined location. The recognition can be based on image processing, RFID detection, optical bar code scan, text capture and compare, beacon detection, other such recognition methods, or combination of two or more of such recognition methods. For example, one or more images and/or video of an area corresponding to a delivery location may be captured by one or more cameras of a UAS while in the process of delivering a package. Image and/or video processing can be performed to detect an intended delivery pad where the package is to be delivered. In some instances, for example, a delivery pad or other object to be recognized may include a predefined color pattern, alphanumeric characters, barcode, etc. that can be detected through image recognition of images and/or video captured by a UAS while the UAS is flying over the area corresponding to the delivery location. As another example, image processing can detect a person located in an area corresponding to the delivery location, and using facial recognition can confirm the person is an individual with which the UAS is intended to interact in delivering the package (e.g., a customer to receive the package and/or a person associated with the customer, such as a spouse, child, neighbor, etc.). Additionally or alternatively, some embodiments may receive one or more communications from the object or a device associated with an object (e.g., smartphone associated with a customer). The system may use this communication in identifying and/or confirming the object. In some instances, the UAS may initiate the communication exchange by sending a communication to the intended object and/or a device associated with the object (e.g., a user interface unit 112 associated with a customer).

Figure 2:
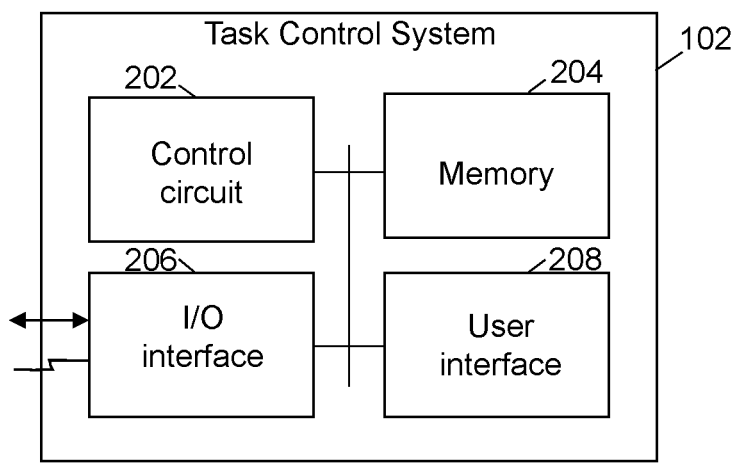
FIG. 2 illustrates a simplified block diagram of an exemplary task control system, in accordance with some embodiments.

FIG. 2 illustrates a simplified block diagram of an exemplary task control system 102, in accordance with some embodiments. The task control system includes one or more control circuits 202, memory 204, and input/output (I/O) interfaces and/or devices 206. Some embodiments further include one or more user interfaces 208. The control circuit 202 typically comprises one or more processors and/or microprocessors. The memory 204 stores the operational code or set of instructions that is executed by the control circuit 202 and/or processor to implement the functionality of the task control system 102. In some embodiments, the memory 204 may also store some or all of particular data that may be needed to schedule deliveries, determine delivery locations, confirm delivery locations, determine flight paths, cause flight paths and/or flight instructions to be communicated to the UAS 104, and make any of the associations, determinations, measurements and/or communications described herein. Such data may be pre-stored in the memory, received from an external source (e.g., retailer distribution system 110, UASs 104, pilot control system 108, user interface units 112, etc.), be determined, and/or communicated to the task control system.

It is understood that the control circuit 202 and/or processor may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the task control system 102; however, the memory 204 can be internal, external or a combination of internal and external memory. Additionally, the task control system typically includes a power supply (not shown) that is typically rechargeable, and/or it may receive power from an external source. While FIG. 2 illustrates the various components being coupled together via a bus, it is understood that the various components may actually be coupled to the control circuit 202 and/or one or more other components directly.

Generally, the control circuit 202 and/or electronic components of the task control system 102 can comprise fixed-purpose hard-wired platforms or can comprise a partially or wholly programmable platform. These architectural options are well known and understood in the art and require no further description here. The task control system and/or control circuit can be configured (for example, by using corresponding programming as will be well understood by those skilled in the art) to carry out one or more of the steps, actions, and/or functions described herein. In some implementations, the control circuit 202 and the memory 204 may be integrated together, such as in a microcontroller, application specification integrated circuit, field programmable gate array or other such device, or may be separate devices coupled together.

The I/O interface 206 allows wired and/or wireless communication coupling of the task control system 102 to external components, such as the UASs 104, retailer system 110, pilot control systems 108, user interface units 112, databases 114, and other such devices or systems. Typically, the I/O interface 206 provides wired and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The user interface 208 may be used for user input and/or output display. For example, the user interface 208 may include any known input devices, such one or more buttons, knobs, selectors, switches, keys, touch input surfaces, audio input, and/or displays, etc. Additionally, the user interface 208 include one or more output display devices, such as lights, visual indicators, display screens, etc. to convey information to a user/worker, such as but not limited to product orders, product information, flight path mapping, flight path information, UAS parameter data, customer information, images, video, communication information (e.g., text messages, emails, etc.), status information, mapping information, operating status information, notifications, errors, conditions, and/or other such information. Similarly, the user interface 208 in some embodiments may include audio systems that can receive audio commands or requests verbally issued by a worker, and/or output audio content, alerts and the like.

Figure 3:
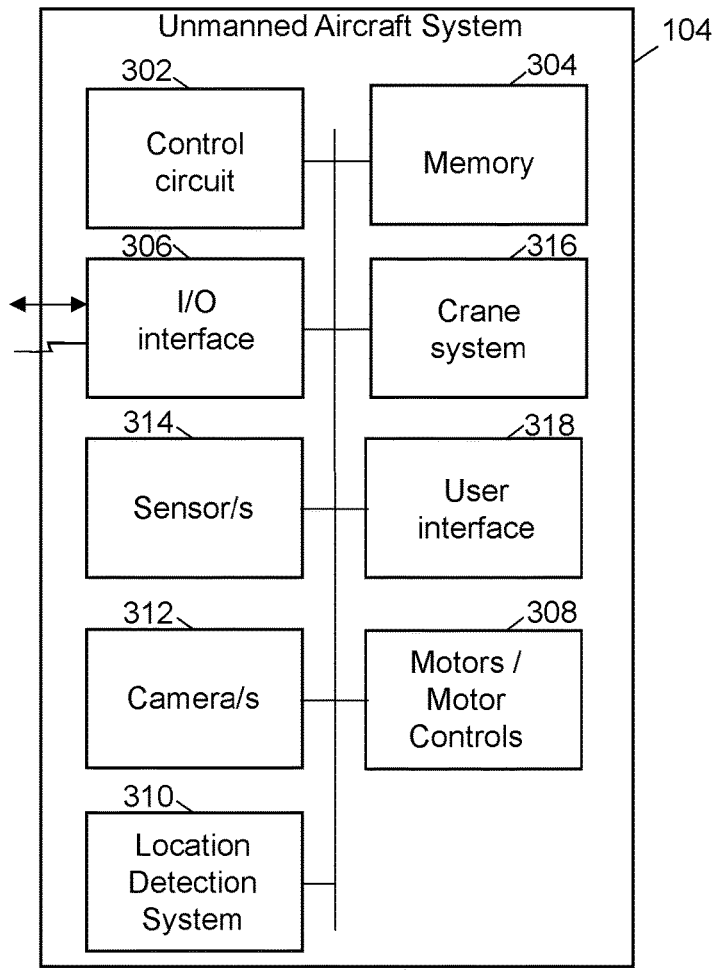
FIG. 3 illustrates a simplified block diagram of an exemplary UAS, in accordance with some embodiments.

FIG. 3 illustrates a simplified block diagram of an exemplary UAS 104, in accordance with some embodiments. The UAS includes one or more UAS control circuits 302, memory 304, input/output (I/O) interfaces and/or devices 306, motors and motor control circuitry 308, location detection systems 310, and one or more cameras 312. Some embodiments further include one or more sensors 314, a crane system 316, a user interface 318, and/or other such systems. The UAS control circuit 302 comprises one or more processors and/or microprocessors and couples with the memory 304 that stores operational codes or sets of instructions that are executed by the UAS control circuit 302 and/or processor to implement the functionality of the UAS 104. In some embodiments, the memory 304 may also store some or all of particular data that may be needed to navigate to delivery locations and deliver one or more products. It is understood that the UAS control circuit 302 may be implemented as one or more processor devices as are well known in the art. Similarly, the memory 304 may be implemented as one or more memory devices as are well known in the art, such as those described above. Further, the memory 304 is shown as internal to the UAS 104; however, the memory 304 can be internal, external and wirelessly accessible, or a combination of internal and external memory. Additionally, the UAS typically includes a power supply (not shown) that is typically rechargeable, and/or it may receive power from an external source. While FIG. 3 illustrates the various components being coupled together via a bus, it is understood that the various components may actually be coupled to the UAS control circuit 302 and/or one or more other components directly.

The UAS control circuit 302 and/or electronic components of the UAS 104 can comprise fixed-purpose hard-wired platforms or can comprise a partially or wholly programmable platform. These architectural options are well known and understood in the art and require no further description here. The UAS and/or UAS control circuit can be configured (for example, by using corresponding programming as will be well understood by those skilled in the art) to carry out one or more of the steps, actions, and/or functions described herein. In some implementations, the UAS control circuit 302 and the memory 304 may be integrated together, such as in a microcontroller, application specification integrated circuit, field programmable gate array or other such device, or may be separate devices coupled together.

The I/O interface 306 allows wired and/or wireless communication coupling of the UAS 104 to external components, such as task control system 102, the retailer system 110, pilot control system 108, in some instances one or more user interface units 112, and other such devices or systems. Typically, the I/O interface 306 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc.

The location detection system 310 obtains location information to determine a current location of and track the location and movements of the UAS. The UAS control circuit 302 utilizes the location information in controlling the movements of the UAS. In some instances, the location detection system may include a global positioning detection system and/or system that received global positioning coordinate information, Wi-Fi signal triangulation and/or evaluation system, cellular tower triangulation system, beacon detection, and/or other such location detection system. Further, the location detection system may use information provided by one or more sensors 314 in determining and/or tracking location information. The sensors can include substantially any relevant sensor such as, but not limited to, one or more inertial sensors, accelerometers, altimeters, gyroscopes, compasses, distance measurement systems (e.g., ultrasound, laser, etc.), and/or other such sensor information. Other sensors 314 may be included that may or may not be used for location detection, such as but not limited to wireless signal strength sensor, weather sensors, magnetic radiation detection sensors, movement detector (e.g., detecting movement within a threshold distance of the delivery location), and the like.

Typically, the UAS 104 includes one or more cameras 312 that capture images and/or video that can be evaluated by the UAS control circuit 302 of the UAS and/or communicated to the task control system 102 for processing. In operation, the UAS control circuit 302 of the UAS can activate one or more of the cameras 312, which may be in response to a command from the task control system, in response to a pilot command received from the pilot control system, the UAS control circuit activates one or more cameras based on a predefined delivery sequence (e.g., when within a threshold distance of the delivery location activate a camera to capture images and/or video, when hovering over the delivery site, while lowering the UAS, while lowering the package by a crane system 316, and the like), and the like. Some embodiments include different cameras directed in different general directions (e.g., up, down, forward, backwards), additionally or alternatively, one or more cameras may be cooperated with camera directional control systems (e.g., motors, tracks, gimbals, etc.) that can control the movement of one or more cameras. In some embodiments, the one or more cameras provide omnidirectional imaging and/or video capabilities. As introduced above, in some embodiments one or more pictures and/or video captured by the camera/s 312 of the UAS can be evaluated in detecting and/or identifying one or more objects with which the UAS is supposed to interact. Further, in some applications video can be communicated to the pilot control system to allow a pilot to see the conditions at and/or around the delivery location.

In some implementations, a UAS 104 may include a crane system 316 that allows a product being delivered to be lowered to the delivery site while the UAS hovers over the delivery site, and typically hovers at or above a threshold height above the delivery site. The crane system and/or a package release system may in some embodiments be implemented in accordance with or similar to the crane systems, and/or release system described in U.S. Provisional Application No. 62/222,572, for Nathan G. Jones et al., filed Sep. 23, 2015, and entitled SYSTEMS AND METHODS OF DELIVERING PRODUCTS WITH UNMANNED DELIVERY AIRCRAFTS, and U.S. Provisional Application No. 62/222,575, for Nathan G. Jones, filed Sep. 23, 2015, and entitled PACKAGE RELEASE SYSTEM FOR USE IN DELIVERY PACKAGES, AND METHODS OF DELIVERING PACKAGES, which are incorporated herein by reference in their entirety.

In some implementations, the UAS may include one or more user interfaces 318 that can be used for user input and/or output display. For example, the user interface 318 may include any known input devices, such one or more buttons, knobs, selectors, switches, keys, touch input surfaces, audio input, and/or displays, etc. Additionally, the user interface 318 includes one or more output display devices, such as lights, visual indicators, display screens, etc. to convey information to a user. Similarly, the user interface 318 in some embodiments may include audio systems that can receive audio commands or requests verbally issued by a worker, and/or output audio content, alerts and the like.

Figure 4:
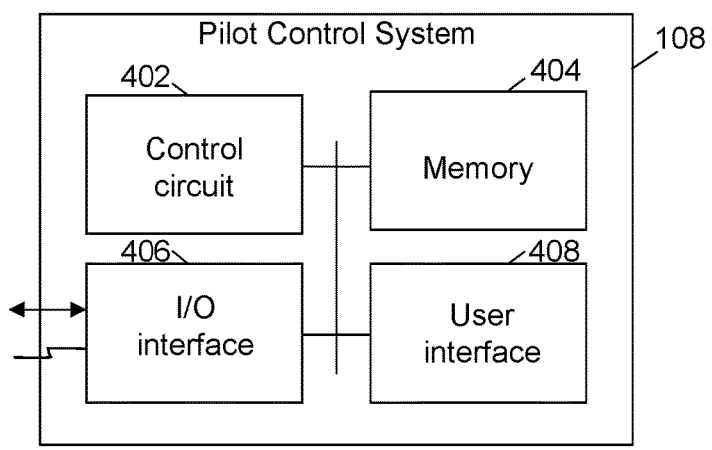
FIG. 4 illustrates a simplified block diagram of an exemplary pilot control system, in accordance with some embodiments.

FIG. 4 illustrates a simplified block diagram of an exemplary pilot control system 108, in accordance with some embodiments. The pilot control system includes one or more pilot system control circuits 402, memory 404, input/output (I/O) interfaces and/or devices 406, user interfaces 408. The pilot system control circuit 402 typically comprises one or more processors and/or microprocessors, and couples with the memory 404 to access operational code or set of instructions that are executed by the control circuit 402 to implement the functionality of the pilot control system 108. In some embodiments, the memory 404 may also store some or all of particular data that may be needed to remotely control the UASs 104, and make any of the associations, determinations, measurements and/or communications described herein. It is understood that the control circuit 402 and/or memory 404 may be implemented as one or more processor devices and memory as are well known in the art, such as those described above. Further, the memory 404 is shown as internal to the pilot control system 108; however, the memory 404 can be internal, external or a combination of internal and external memory. While FIG. 4 illustrates the various components being coupled together via a bus, it is understood that the various components may actually be coupled to the pilot system control circuit 402 and/or one or more other components directly. In some implementations, the pilot system control circuit and the memory 404 may be integrated together, such as in a microcontroller, application specification integrated circuit, field programmable gate array or other such device, or may be separate devices coupled together.

The I/O interface 406 allows wired and/or wireless communication coupling of the pilot control system 108 to external components, such as the UAS 104, task control system 102, retailer system 110, databases 114, and other such devices or systems. Typically, the I/O interface 406 provides at least wireless communication (e.g., cellular, satellite, Wi-Fi, Bluetooth, RF, and/or other such wireless communication), and in some instances may include any known wired and/or wireless interfacing device, circuit and/or connecting device, such as but not limited to one or more transmitter, receiver, transceiver, etc. The user interface 408 is used for user input and/or output display. For example, the user interface 408 may include any known input devices, such one or more buttons, knobs, selectors, switches, keys, touch input surfaces, joysticks, dials, audio input, and/or displays, etc. Additionally, the user interface 408 further includes one or more output display devices, such as lights, visual indicators, display screens, etc. to convey information to a user/worker, such as but not limited to video data, images, delivery location parameters and/or statistics, product information, flight path mapping, flight path information, UAS parameter data, customer information, communication information (e.g., text messages, emails, etc.), status information, mapping information, operating status information, notifications, errors, conditions, and/or other such information. Similarly, the user interface 408 in some embodiments may include audio systems that can receive audio commands or requests verbally issued, and/or output audio content, alerts and the like.

Further, some embodiments provide a bank of pilot control systems 108 with one or more pilots manning the pilot control systems while UASs are scheduled to and/or while UASs are performing tasks. Through the pilot control system a pilot can remotely take over at least some of the controls of a UAS. The pilot system control circuit can receive a notification that pilot assistance is requested while the UAS is within a threshold pilot control distance of the task location (e.g., delivery location). Remote control over at least some of the controls of the UAS can be established through the transceiver. As such, commands can be received through the user interface 408 from a pilot, and be communicated to the UAS to implement the commands such that the pilot controls at least some aspects of the UAS and/or takes over total control of the UAS. Typically, the pilot can take over control during any time the UAS is in operation (e.g., the UAS is preparing for flight, in flight, and/or shortly after flight begins, etc.). For example, in some instances, a pilot may take over at least partial control at least during a depositing of the product at the delivery location.

As described above, some embodiments utilize distribution vehicles 118. One or more UAS 104 and products to be delivered can be loaded into the launch vehicles. Based on scheduled deliveries, the launch vehicles can be routed to predetermined launch locations that are within a predefined flight distance (e.g., based on battery power, weight of the package being delivered, weather conditions, etc.) of one or more scheduled delivery locations. The one or more UASs, which may be cooperated with one or more of the products to be delivered, can then be launched from the launch vehicles. The distribution vehicle 118 can travel to multiple different launch locations to implement multiple different scheduled deliveries. Further, after launch, a distribution vehicle may proceed to a subsequent launch location to launch one or more other UASs and then subsequently return to a first launch location to retrieve one or more previously launched UASs.

Some embodiments provide systems that enable UASs to implement tasks and to recognize an intended object at a task location. Sensor data is captured by at least one sensor of a UAS. Again, the sensor data may be image and/or video content, text recognition, RFID signal, bar code detection, other such sensor data, or combination of two or more of such sensor data. From the sensor data a unique identification can be determined of an object at a predefined location. Based on the identification and the sensor data, the system can confirm that the identified object is an expected object expected at the predefined location. The confirmation of the object allows the system to take one or more actions to allow the UAS to interact with the object. The UAS, a pilot, and/or a task control system can further detect potential objects that are to be avoided (e.g., trees, elevated electrical lines, buildings, and the like). However, the system uses sensor data to additionally identify an object at an expected location that is intended to be interacted with allowing the UAS to effectively perform a task with a level of confidence.

The UAS control circuit 302 can receive, in some applications as at least part of the sensor data, image data captured by a camera on the UAS. Typically, the UAS control circuit can orient a camera and/or the UAS to capture one or more images and/or video. The image and/or video data can be processed (e.g., image processing, text capturing, and the like) to detect one or more features that correspond to the expected object. This may be a pattern, detected movement, other such features, or combination of such features. In some implementations, the image processing and object identification is performed local on the UAS. Further, the UAS may identify a location where the expected object is predicted to be detected. Accordingly, the UAS control circuit can limit the evaluation of sensor data until the UAS is within a threshold distance of the location. In some embodiments, the UAS control circuit can obtain a unique identification of the object from image processing sensor data. For example, in some applications, the UAS may recognize a delivery pad based on a predefined pattern on the landing pad. This pattern can be configured to be readily discernible from an image taking by a camera at heights of hundreds or even thousands of feet above the landing pad. Similarly, the image processing may recognize a predefined number, bar code or other such unique identification on a storage locker, a delivery pad, a roof of a distribution vehicle, one or more flags at a location, or other such objects. In some applications, the UAS control circuit, in obtaining the unique identification, obtains from the image processing a delivery pad identifier that is unique to the delivery pad associated with the predefined location and distinct from other similar and different delivery pads. As introduced above, the delivery pad is configured to receive a package to be delivered by the UAS.

In some embodiments, UAS control circuit 302 causes facial recognition processing to be performed on one or more images and/or video of the predefined location. In obtaining the unique identification, the UAS may obtain an identification through the facial recognition of a customer positioned proximate the predefined location. In some applications, images and/or video content may be communicated to a remote image and/or video processing system (e.g., as part of the task control system). A database may be accessed of numerous objects, customers, workers, and other such objects. Through a comparison of pre-obtained images with the image processing, the system may correlate a customer's facial features with features of a pre-obtained and processed image of the customer. For example, the customer may have registered with a delivery service, with a retail entity, or the like, and provided one or more images of themselves and/or other persons that may receive a delivery on their behalf. The images and/or image processing can be associated with one or more predefined locations where deliveries for which that customer is to be associated (e.g., home, vacation home, work location, etc.). As such, the image processing can correlate the UAS captured image with a previously obtained image and/or image processing to confirm an expected person is at the location.

In some embodiments, the system can further confirm an object based on communication from the object and/or a device previously associated with the object. For example, the UAS 104 and/or the task control system 102 may further receive a communication from a user interface unit 112 preregistered to be associated with a customer or other person at the predefined location. In some instances, the communication is received through a wireless transceiver, and the UAS and/or the delivery system can detect communication from the user interface unit associated with the customer who is associated with the predefined location. Further, the UAS may initiate a communication exchange by broadcasting a beacon signal, generating an optical signal, and/or initiating an intended direct communication (e.g., via cellular communication or text message to a customer's user interface unit). The UAS control circuit, in confirming the identified object is the expected object, can at least in part confirm the identified object based on the received sensor data and the detected communication from the user interface unit. Similarly, the control circuit, in determining the unique identification of the object, may receive a communication from a distribution vehicle 118. In some implementations, for example, the communication can comprise an identification of the distribution vehicle. The control circuit confirms that the identification of the distribution vehicle is consistent with an expected distribution vehicle assigned to transport the UAS away from the predefined location.

The sensor data may further be utilized in interacting with the object and/or in performing the task. For example, the sensor data may be used to confirm there is sufficient space at a delivery location to deliver a package. This can include, for example, confirming that if there is something on a delivery pad there is still sufficient space to deliver a package. The confirmation of sufficient space may be relevant, for example, when a customer is returning a package via a UAS. In some instances, the control circuit is further configured to receive additional sensor data from the UAS. The control circuit may identify that a package is located on the delivery pad, in the delivery locker or at another predefined location. Again, the delivery pad or the like may be intended to receive a package being delivered by the UAS. The control circuit can evaluate the space surrounding the package on the delivery pad and confirm there is sufficient space on the delivery pad, which is not occupied by the already placed package, to receive a package being carried by the UAS. The UAS can initiate delivery of the package in response to confirming there is sufficient space on the delivery pad to deliver the package. In other instances, the camera data may indicate that there is snow or other such obstruction that blocks some or all of the delivery pad. The UAS can use the dimensions of package being delivered to determine whether the package will fit. Some embodiments may detect markings, measurements on the delivery pad, digital watermarking of a size of delivery area, and use this information to detect how much area is blocked to determine an amount of area available to receive a package. In some instances, a pilot may be notified to request confirmation and/or to take over delivery controls. Additionally or alternatively, the customer may be notified that there is insufficient space and request the customer remove the items on the delivery pad or to select an alternative delivery location. In other implementations, the UAS or another UAS may be instructed to retrieve the returned package prior to delivering a subsequent package.

In some implementations, the sensor data can be used to verify a correct package to be carried by the UAS 104. The control circuit, in determining identification of an object, may identify or determine a package identifier from the sensor data of an expected package to be cooperated with the UAS. The package may be a package intended to be delivered by the UAS to a delivery location, a package being returned by a customer, or the like. The sensor data may include reading a bar codes, detecting a size, shape and/or coloring, detecting one or more predefined markers, RFID data, other such data, or a combination of two or more of such data.

Figure 5:
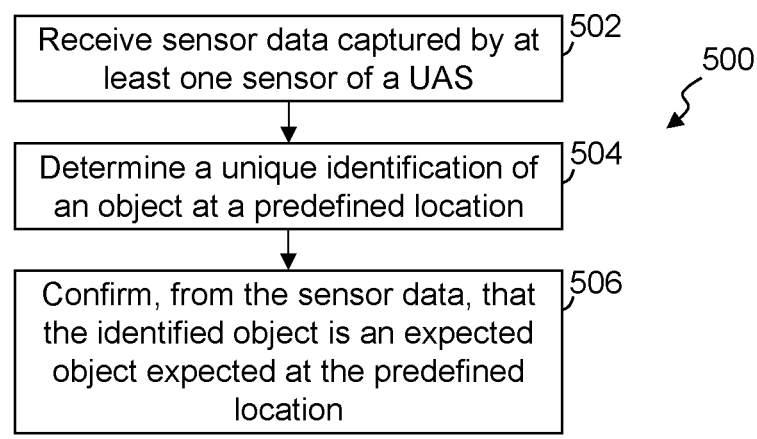
FIG. 5 illustrates a simplified flow diagram of an exemplary process of controlling one or more UASs, in accordance with some embodiments.

FIG. 5 illustrates a simplified flow diagram of an exemplary process 500 of controlling one or more UASs, in accordance with some embodiments. In step 502, sensor data captured by at least one sensor of a UAS is received. Again, the sensor data may be RFID sensor data, image and/or video data, distance measurement data, beacon data, and/or other such sensor data. In step 504, a unique identification of an object at a predefined location is determined at least in part from the sensor data. Further, the unique identification is specific to that object and distinguishes that object from other objects.

In step 506, the system confirms, from the sensor data, that the identified object is an expected object expected at the predefined location. In some instances, the object and/or characteristics of the object are registered with the task control system, the retailer system 110, and/or other such system or database. Accordingly, in confirming the identification of the object, the system can limit the number of objects that are considered. This limited number of objects can greatly increase the speed of confirmation. Similarly, in some applications, the limited number of items can reduce the amount of data that is communicated to the UAS in evaluating the sensor data and with which is to be compared to the sensor data.

Some embodiments in receiving the sensor data receive image data captured by a camera on the UAS. The UAS and/or the task control system can use this image data to obtain the unique identification of the object from image processing. The object may be a person, a delivery locker, a delivery pad, a flag, or other such object. For example, in some instances, a control circuit can obtain from the image processing a delivery pad identifier that is unique to a delivery pad associated with the predefined location. Typically, the delivery pad identifier is distinct from other similar and different delivery pads. Again, the delivery pad can be a location, marker, bin, mat or the like that is configured to receive a package to be delivered by the UAS. Additionally or alternatively, in some implementations the sensor data is utilized to obtain an identification through facial recognition of a customer positioned proximate the predefined location.

Some embodiments further receive additional sensor data from the UAS. Using this additional sensor data, the system can detect a first package is located on the delivery pad. Based on this detection, the UAS and/or the task control system can confirm there is sufficient space on the delivery pad, which is not occupied by the first package, to receive a second package being carried by the UAS. Based in part on the confirmation that there is sufficient space on the delivery pad to deliver the second package, the UAS can initiate delivery of the second package.

The UAS and/or the task control system may be in communication with the customer, a distribution vehicle, and/or other objects that may affect the routing, flight and/or task implementation. In some implementations, for example, a detected communication from a user interface unit 112 associated with a customer who is associated with the predefined location. The detected communication from the user interface unit can be used in cooperation with the received sensor data in confirming the identified object. For example, facial recognition can be used to identify a customer at a task location, and communication from a user interface unit 112 that has been previously associated with that customer can be used as at least part of the confirmation of the identification of the customer, a delivery pad associated with the customer, or other such object. Further, communications from an object can include receiving a communication from a distribution vehicle 118. The communication from the distribution vehicle can include an identification of the distribution vehicle. Using the identification, the system can confirm the identification of the distribution vehicle is consistent with an expected distribution vehicle assigned to transport the UAS away from the predefined location. Sensor data may further be used to confirm the accuracy of a package to be delivered by the UAS, picked up by a UAS or the like. In some embodiments, the determination of the unique identification of the object can include determining, from the sensor data, a package identifier of an expected package to be cooperated with the UAS and to be delivered by the UAS to a delivery location.

Accordingly, the UASs can utilize sensor data, in part, to remove governmental restrictions (e.g., requiring line of sight operation), and can safely and effectively complete autonomous tasks such as beyond line of sight (BLOS) package delivery, video capture of an event or building, counting objects, and other such tasks. The sensor data not only allows the UAS to autonomously avoid obstacles in the UAS's flight path or its delivery area, but also the ability to identify classes, types and specific instances of objects (e.g., buildings, people, and other objects). A package delivery task can involve a package loading, UAS launch, airborne waypoint navigation using the global positioning system (GPS) or similar technology coupled with object avoidance, delivery location ranging and identification, package delivery, which may include specific object and behavior recognition along with avoidance and interaction based on those objects and behaviors, return to airborne waypoint navigation, return location (e.g., warehouse, store, distribution vehicle, etc.) ranging and identification, and UAS landing at return location. In some cases, the UAS may also be used to pick up a package (e.g., to eliminate a manual package loading step or for customer returns).

The UAS control system 100 takes advantage of identifying a collection of classes, types and/or specific objects and response to these objects. The responses may include avoidance, interaction, observation, recording or other functions depending on the class and specific instance of the encountered object as well as the portion of the task the UAS is currently performing. In some embodiments, the UAS identify an object as being within a class of objects. The classes can include, for example: packages, task/delivery locations, vehicles, people, pets, buildings, obstructions (e.g., trees, poles, power lines, and other obstructions). Packages may be items that the UAS may be used to deliver. Some embodiments may utilize several iterations of generic package identification, ranging from identifying specific types of packages by size, shape, color, marking, bar codes, digital watermarks, RFID tags or other methods. Some implementations may simplify an iteration by using a small set of possible options. For example, a tote or box with specific markings that are easily identifiable might be used to contain the items to be delivered. This would limit the need for the UAS to determine how to pick up the package (only a pre-determined, finite number of possibilities would be offered), balance it and carry it. The one variable that the UAS would take into account would be differences in weight between packages. The weight could be measured by the UAS, or encoded in digital format on the tote, package labeling, etc. The UAS are typically provided with a flight path to a task location. In some instances, the UAS can identify a task location based on GPS coordinates and using other sensor data. Additionally, the UAS may be able to detect the task location based on a clearly marked landing zone, a delivery receptacle, other easily distinguishable landmark, and the like. Further, in some implementations, the system and/or the UAS can determine whether obstructions exist at a task location and/or on the delivery location (e.g., a previously delivered package that has not been retrieved by a customer). In some applications, the UAS may be able to alert the customer when an obstruction is detected requesting the customer to clear the delivery location and/or lading location. Similarly, the UAS may determine whether there is sufficient room to place the new package, use an alternative delivery method (e.g., drop the merchandise from a height rather than placing it directly on the landing zone and releasing it), rescheduling delivery time or location, etc.

In some embodiments, the UAS may further identify various classes of vehicles, including delivery trucks from which the UAS may be launched for last mile delivery, passenger automobiles, emergency vehicles, other aircraft including UASs, helicopters and airplanes, bicycles, motorcycles, boats, etc. Further, the UAS may implement a flight path and perform sensor processing to return to a distribution vehicle, either while the vehicle is stationary or in motion. Similarly, the UAS may perform processing to identify vehicles to avoid, as other such traffic (e.g., naval, airborne traffic). In some implementations the UAS control system and/or UAS is able to identify a class of people (e.g., adults versus children, UAS operators, customers, bystanders, etc.), and/or individual people. The recognition of people can be used in part to avoid contact with and injury to people during flight operations. In other instances, as described above, the UAS may identify a specific person in order to interact with that identified person. Still further, in some instances, the UAS control system and/or UAS may recognize pets and other animals avoid contact with, injury to or damage from them during flight operations.

The UAS system and/or UASs are typically further configured to detect structures and/or identify buildings, including those that host delivery locations (e.g., personal residences, apartments, office buildings, etc.) as well as inventory sources for its packages to be delivered (e.g., distributions centers, warehouses, retail outlets, etc.). The UAS can automatically avoid contact with buildings to prevent damage to itself, while also being able to navigate to specific portions of a building (e.g., to deliver a package, return to a warehouse, etc.). Other obstacles, such as but not limited to trees, poles, power lines, guy-wires, and other obstructions can be detected during flight operations to prevent contact with them and damage to the UAS.

Some embodiments identify classes of objects to building out capabilities for flight operations, safety, and task performance. The UAS system is further typically configured to identify a specific instance of one of those classes. For example, the UAS may identify a specific package beyond simply identifying that an object is a package. This can include identifying a specific package that is scheduled for delivery. In some instances, multiple packages may be situated within a distribution center or on a delivery truck. The UAS may be configured to pick a specific package from amongst several others, attach to it, lift it and deliver it to its rightful destination. Similarly, in some instances, the UAS may recognize and/or identify a specific package for return services. Further, the UAS system and/or UAS may identify a specific delivery location. Some embodiments, for example, may incorporate a standard design for delivery (e.g., a landing pad or secure locker to which the UAS will deliver a package). Additionally or alternatively, the UAS system can further identify a specific location from others to provide correct delivery. In some instances, unique identifies can be detected at the location. Further, sensor data may be used in cooperation with location identifying information as further confirmation of location.

The UAS system and/or the UAS may in some embodiments further identify specific people, for example a customer to whom a package is to be delivered. For example, facial recognition can be used to compare facial features to a database of facial data to identify a person. Similarly, the UAS system and/or UAS may identify specific vehicles (e.g., distribution and/or delivery vehicles). For example, a distribution vehicle that the UAS is to locate to be retrieved after performing a task. As a further example, the UAS may recognize a distribution vehicle from which the UAS was launched so that the UAS can return to pick up additional packages for delivery if possible, or to be recovered in order to be re-charged/re-fueled and to be loaded with additional packages or stored for the duration of the ground-based delivery route. Still further, the UAS system and/or UAS can identify specific building (e.g., store, distribution center, warehouse, etc.) from which it was launched and to which it returns. As with the previous use case, the UAS may pick up additional specific packages and begin a new delivery route, or land to be re-charged/re-fueled or stored until further use.

In some embodiments, the UASs are configured to detect and/or lock in to a signal coming from the distribution vehicle, delivery pad, delivery locker or other location. This enables the UAS to utilize autonomous flight to the distribution vehicle or other location. Additionally or alternatively, the task control system 102 or other central computer system (CCS) to provide routing instructions and/or guide the UAS, such as by GPS in real time, to its area of operations. The UASs can further be instructed and configured to make multiple stops without needing time to re-route after each task location (e.g., after each delivery). In operation, the UAS can activate onboard awareness upon activation or after reaching a threshold elevation.

The UASs include object identification sensors, including for example multi- or omnidirectional video, sonar, ultrasonic, laser ranging, LIDAR (light detection and ranging), infrared detection systems, other such sensor systems, or combination of two or more of such sensor systems. These sensor systems enable the UAS to avoid other objects during flight, and can further be used in navigation and detecting expected objects. When an object comes within detection range, the UAS may take actions to avoid contact such as raise or drop elevation or turn to avoid the obstacle and recalculate its route to its destination. Data from sensors can be fed directly to a distribution vehicle and/or the task control system for tracking. Some or all of the information fed to the task control system may further be communicated to a pilot control system or flight center. The pilot control systems can monitor sensor status and GPS location status, and can allow Flight center associates (e.g., pilots) to take action and/or take over flight control of a UAS. The flight center associates can further relinquish control of a UAS when appropriate (e.g., out of danger, unidentified object is beyond a threshold distance, etc.). Once control is relinquished the UAS automatically resumes where the pilot or ground station left off. Typically, the flight center associates have capability to override current path and divert UASs.

Sensors will help determine elevation above ground level and other objects for accurate delivery. A distance measuring system can coordinate with other object identification systems for more protection and awareness. For example, if an object is detected by sonar, a laser distance measuring system can be activated to find this object and measure where and at what degree from the UAS the object is located. When delivering a package, the distance measuring system will assist in determining the distance from the ground to enable accurate package delivery. After the UAS delivers a package, it will resume elevation of flight. The UAS will finish a route based upon information fed from the task control system and/or flight center. Once the UAS is finished with delivery, it can return to its launch location and/or a distribution vehicle. In some embodiments, the UAS may use signals from the distribution vehicle (e.g., using sonar, GPS, optical beacon, other radio beacon, RFID, and/or other such signals).

Some embodiments identify specific instances of one or more objects of one or more classes of objects. For example, a UAS and/or the UAS control system may identify that an object in a targeted delivery zone is a landing pad or storage locker, but further validation may be achieved in order to determine that the landing pad or storage locker is the correct one. As another example, with attended delivery the UAS may identify a specific person(s) to whom to deliver a package. This may be done, for example, through facial recognition or a combination of object recognition (e.g., a person has been recognized) along with electronic validation of right to receive the delivery (e.g., with a smartphone, beacon or other device whose identity can be independently corroborated with onboard devices of the UAS). For unattended delivery, the UAS can confirm the correct delivery location has been reached and to record for verification the delivery of the package. In some cases, this will be into a secured storage enclosure that can be opened with credentials maintained by the UAS and associated central computer system. Further, in some instances with unattended delivery, the UAS can determine whether there is sufficient space at the delivery location (e.g., on a landing pad or in a secured storage container) to deliver a new package, especially in cases where previous deliveries have been made, packages are being returned, and the like. With unattended package pickup (e.g., for customer returns) the UAS can be configured to identify a specific package that it is to pick up (e.g., through bar code, RFID, etc. In some instances, the UAS determine a best way to cooperate with the package, and may video record the incident for verification. In some cases, the package may be stored in a secure storage container, and the UAS will remotely unlock and open it in order to retrieve the package.

In some embodiments, systems, apparatuses, methods, and processes are provided to control and allocate UASs. In some embodiments, a system to control unmanned aircraft systems (UAS), comprises: one or more wireless transceivers configured to communicate with the UAS; a control circuit coupled with the transceiver(s); and a memory coupled to the control circuit and storing computer instructions that when executed by the control circuit cause the control circuit to perform the steps of: receive sensor data captured by at least one sensor of a UAS; determine, from the sensor data, a unique identification of an object at a predefined location; and confirm, from the sensor data, that the identified object is an expected object expected at the predefined location.

Further, some embodiments provide methods of controlling unmanned aircraft systems (UAS), comprising: receiving sensor data captured by at least one sensor of a UAS; determining, from the sensor data, a unique identification of an object at a predefined location; and confirming, from the sensor data, that the identified object is an expected object expected at the predefined location.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to control unmanned aircraft systems (UAS), comprising:
    one or more wireless transceivers;
    a control circuit coupled with the transceiver(s); and
    a memory coupled to the control circuit and storing computer instructions that when executed by the control circuit cause the control circuit to perform the steps of:
    receive, prior to initiating delivery and lowering by the UAS of a package intended to be delivered to the predefined location to be received by a customer associated with the predefined location, sensor data captured by at least one sensor of a UAS comprising image data captured by a camera on the UAS;
    determine, from the sensor data, a unique identification of a first delivery pad at the predefined location comprising obtaining from image processing of the image data a first delivery pad identifier that is unique to the first delivery pad associated with the predefined location and distinct from other delivery pads, wherein the first delivery pad is configured to at least receive a package to be delivered by the UAS;
    confirm, from the sensor data and prior to initiating the delivery by the UAS of the package intended to be delivered to the predefined location, that the identified first delivery pad is an expected object expected at the predefined location;
    receive additional sensor data from the UAS;
    detect a second package is located on the first delivery pad;
    confirm there is sufficient space on the first delivery pad, not occupied by the second package, to receive the package being carried by the UAS; and
    initiate delivery of the package in response to confirming there is sufficient space on the first delivery pad to deliver the package;
    wherein the control circuit, in determining the unique identification of the first delivery pad, determines a package identifier from the sensor data of the second package expected to be cooperated with the UAS and to be retrieved by the UAS to be returned to a supplier.

2. The system of claim 1, wherein the control circuit is further configured to obtain dimensions of the package being delivered, detect from image processing measurements on the first delivery pad and detect how much area is blocked by the second package, determine an available delivery area not occupied by the second package, and confirm there is sufficient space on the first delivery pad to receive the package will fit.

3. The system of claim 1, wherein the control circuit is further configured to obtain an identification through facial recognition of the customer positioned proximate the predefined location, and confirm the predefined location based on the identification of both the first delivery pad identifier and the facial recognition of the customer.

4. The system of claim 1, wherein the control circuit is further configured to: receive a communication from a distribution vehicle wherein the communication comprises an identification of the distribution vehicle, obtain additional image data captured by the camera on the UAS, while the UAS is above a roof of the distribution vehicle, obtain a unique identification of the distribution vehicle at a location from image processing of the additional image data, and confirm that the identification of the distribution vehicle is consistent with an expected distribution vehicle assigned to transport the UAS away from the predefined location.

5. The system of claim 1, wherein the control circuit is further configured to confirm the predefined location based on the identification of both the first delivery pad identifier and the package identifier of the second package.

6. The system of claim 1, wherein the first delivery pad identifier comprises a predefined pattern of colors.

7. The system of claim 1, wherein the control circuit further receives, through the wireless transceiver, a detected communication from a user interface unit associated with the customer who is associated with the predefined location, wherein the control circuit, in confirming the identified first delivery pad is the expected object, confirms the identified first delivery pad based on the received sensor data and the detected communication from the user interface unit.

8. The system of claim 7, wherein the control circuit is further configured to obtain an identification through facial recognition of a customer positioned proximate the predefined location, and confirm the predefined location based on the identification of the first delivery pad identifier, the detected communication from the user interface unit, and the facial recognition of the customer.

9. The method of claim 1, further comprising:
obtaining, by the UAS, dimensions of the package being delivered, detect from image processing measurements on the first delivery pad;
detecting how much area is blocked by the second package;
determining an available delivery area not occupied by the second package, and
confirming there is sufficient space on the first delivery pad to receive the package will fit.

10. A method of controlling unmanned aircraft systems (UAS), comprising:
receiving, prior to initiating delivery and lowering by a UAS of a package intended to be delivered to a predefined location to be received by a customer associated with the predefined location, sensor data captured by at least one sensor of the UAS comprising image data captured by a camera on the UAS;
determining, from the sensor data, a unique identification of a first delivery pad at the predefined location comprising obtaining from image processing of the image data a first delivery pad identifier that is unique to the first delivery pad associated with the predefined location and distinct from other delivery pads, wherein the first delivery pad is configured to at least receive a package to be delivered by the UAS;
confirming, from the sensor data and prior to initiating the delivery by the UAS of the package intended to be delivered to the predefined location, that the identified first delivery pad is an expected object expected at the predefined location;
receiving additional sensor data from the UAS;
detecting a second package is located on the first delivery pad;
confirming there is sufficient space on the first delivery pad, not occupied by the second package, to receive the package being carried by the UAS; and
initiating delivery of the package in response to confirming there is sufficient space on the first delivery pad to deliver the second package;
wherein the determining the unique identification of the first delivery pad comprises determining, from the sensor data, a package identifier of the second package expected to be cooperated with the UAS and to be retrieved by the UAS to be returned to a supplier.

11. The method of claim 10, further comprising:
receiving a detected communication from a user interface unit associated with the customer who is associated with the predefined location; and
wherein the confirming the identified first delivery pad is the expected object comprises confirming the identified first delivery pad based on the received sensor data and the detected communication from the user interface unit.

12. The method of claim 11, further comprising:
obtaining an identification through facial recognition of the customer positioned proximate the predefined location; and
confirming the predefined location based on the identification of the first delivery pad identifier, the detected communication from the user interface unit, and the facial recognition of the customer.

13. The method of claim 10, further comprising:
obtaining an identification through facial recognition of the customer positioned proximate the predefined location, and confirm the predefined location based on the identification of both the first delivery pad identifier and the facial recognition of the customer.

14. The method of claim 10, further comprising:
receiving a communication from a distribution vehicle, wherein the communication from the distribution vehicle comprises an identification of the distribution vehicle;
obtain additional image data captured by the camera on the UAS, while the UAS is above a roof of the distribution vehicle, obtain a unique identification of the distribution vehicle at a location from image processing of the additional image data; and
confirming that the identification of the distribution vehicle is consistent with an expected distribution vehicle assigned to transport the UAS away from the predefined location.

15. The method of claim 10, further comprising:
  confirming, by the UAS, the predefined location based on the identification of both the first delivery pad identifier and the package identifier of the second package.

16. The method of claim 10, further comprising identifying that the first delivery pad identifier comprises a predefined pattern of colors.

\* \* \* \* \*

UNITED STATES PATENT AND TRADEMARK OFFICE
CERTIFICATE OF CORRECTION

PATENT NO. : 10,139,817 B2
APPLICATION NO. : 15/457638
DATED : November 27, 2018
INVENTOR(S) : Donald R. High Page 1 of 1

It is certified that error appears in the above-identified patent and that said Letters Patent is hereby corrected as shown below:

In the Claims

Column 17, Line 50, Claim 9, delete "method" and insert --system--, therefor.

Signed and Sealed this
Nineteenth Day of March, 2019

Andrei Iancu
*Director of the United States Patent and Trademark Office*